T. A. BLANCHARD.
Improvement in Apparatus for Drying Flock or Velvet Paper.
No. 130,406. Patented Aug. 13, 1872.
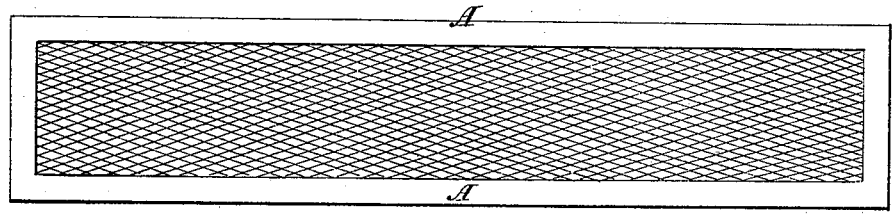
Fig. 2.
Fig. 1.
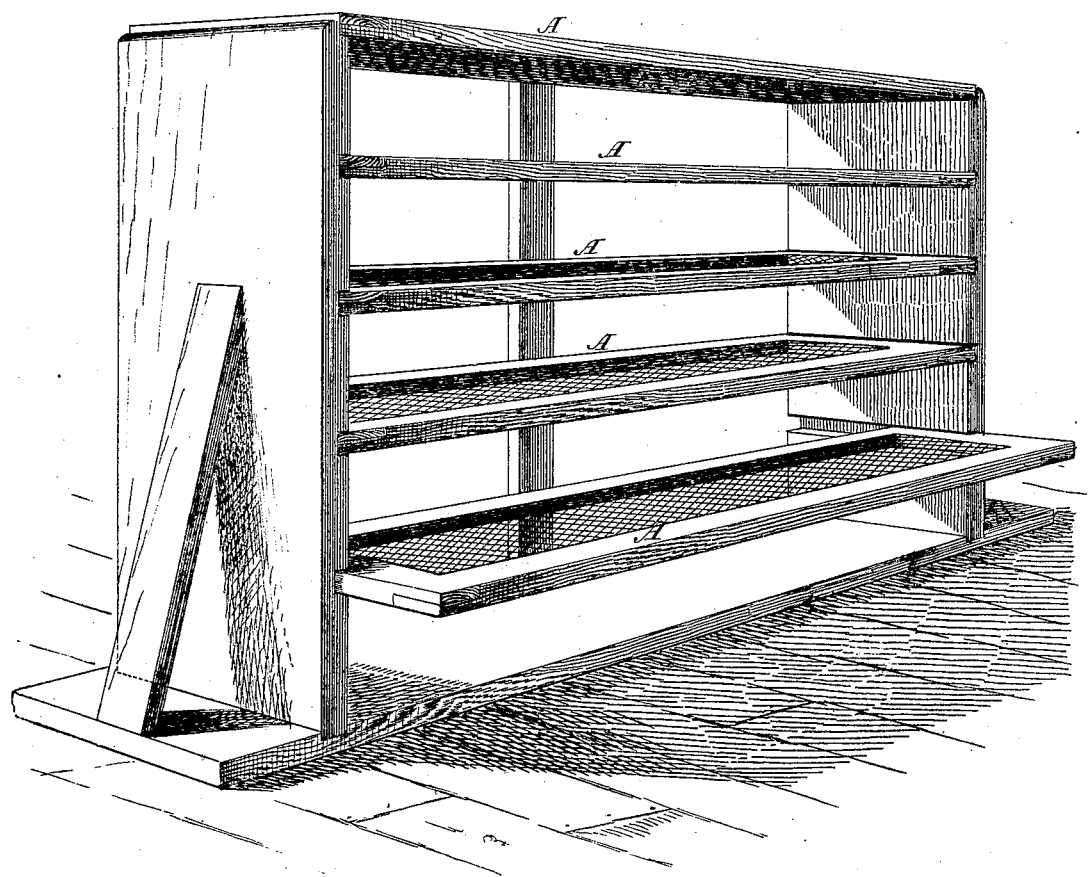

UNITED STATES PATENT OFFICE.

THEODORE A. BLANCHARD, OF NEW YORK, N. Y.

IMPROVEMENT IN APPARATUS FOR DRYING FLOCK OR VELVET PAPER.

Specification forming part of Letters Patent No. 130,406, dated August 13, 1872.

Specification describing a new and useful Improvement in Drying Flock or Velvet Papers, invented by THEODORE A. BLANCHARD, of the city, county, and State of New York.

Figure 1 is a perspective view of my improved apparatus. Fig. 2 is a detail view of one of the shelves.

Similar letters of reference indicate corresponding parts.

My invention has for its object to furnish an improved mode of drying flock, or velvet papers after they have been flocked, which shall remedy certain difficulties heretofore encountered; and it consists in supporting the papers in a horizontal or nearly horizontal position, during the drying operation, upon drying-frames prepared for that purpose, as hereinafter more fully described.

Flock-paper after being flocked has heretofore been dried by looping or festooning the paper over poles, which were usually arranged so that they could be moved closer together or further apart, as circumstances required. This mode of drying the paper, though allowing the air to circulate freely about the paper, always permanently creased or marked it where it passed over the poles. This disfigurement was very detrimental, but was never overcome previous to my invention.

In my mode of drying flock-paper the paper to be dried is extended horizontally upon shelves A, which are designed to equal or exceed in length the length of the pieces of paper to be dried. The ends of the shelves A are supported by grooves formed in, or by cleats attached to, the walls of the room or other suitable support. The middle parts of the shelves A may also be supported, if desired. The shelves A are made in the form of open frames, and covered with gauze or some other suitable material, so made or arranged as to allow the air to have access to both sides of the paper. The shelves A are so arranged that they can be drawn out for convenience in placing the paper upon them, as shown in Fig. 2.

Having thus described my invention, I claim as new and desire to secure by Letters Patent—

The method of supporting flock or velvet paper while drying after being flocked, by means of shelves horizontally arranged, and provided with apertures, as set forth.

THEODORE A. BLANCHARD.

Witnesses:
 JAMES T. GRAHAM,
 T. B. MOSHER.